Oct. 9, 1923.
B. HALL
1,470,564
TRANSMISSION MECHANISM
Filed Nov. 8, 1913
2 Sheets-Sheet 1
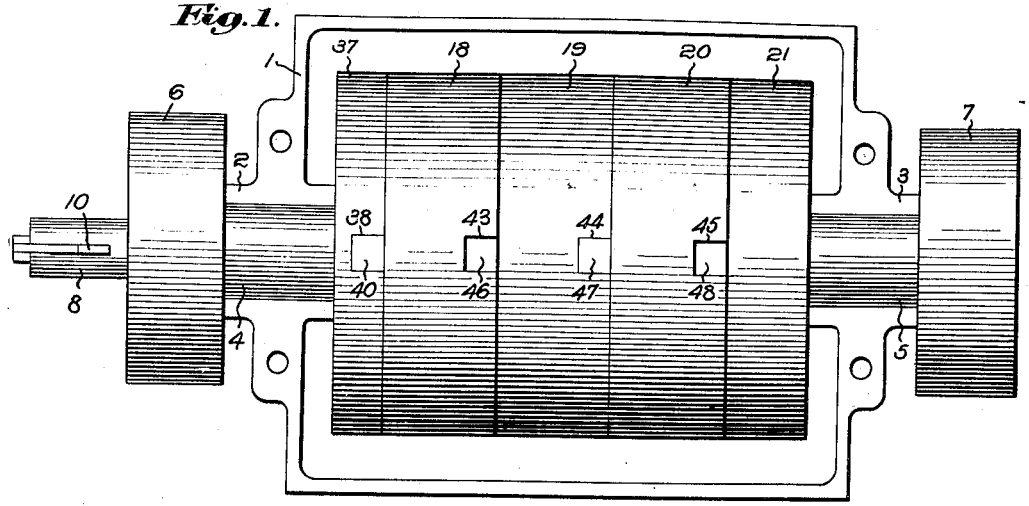
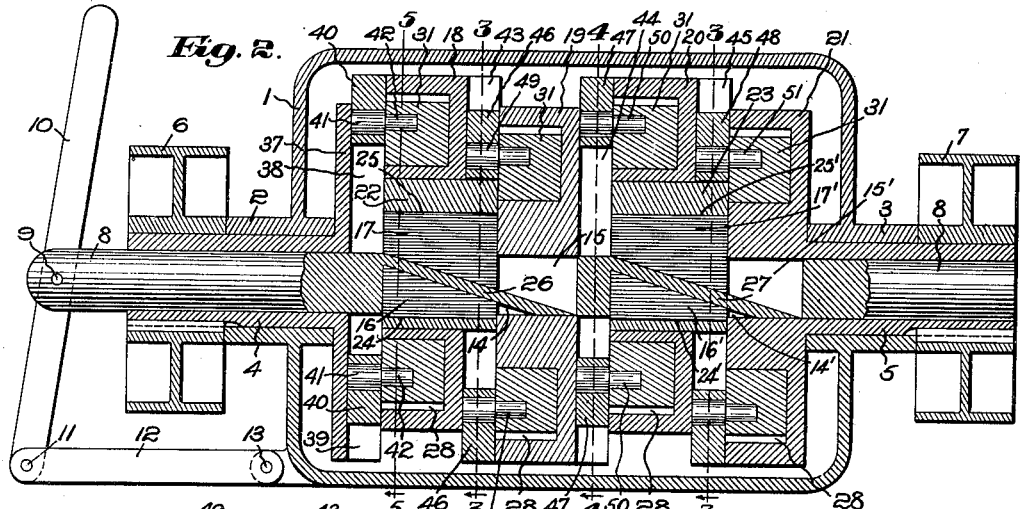
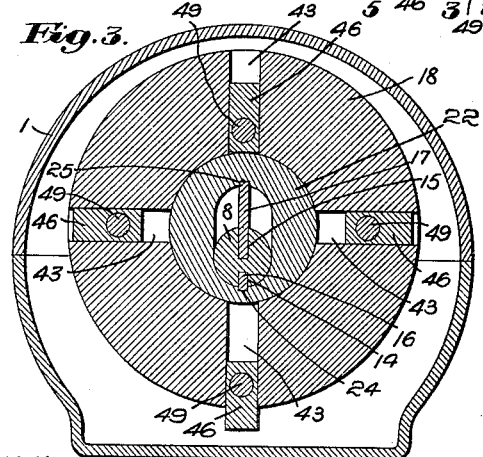
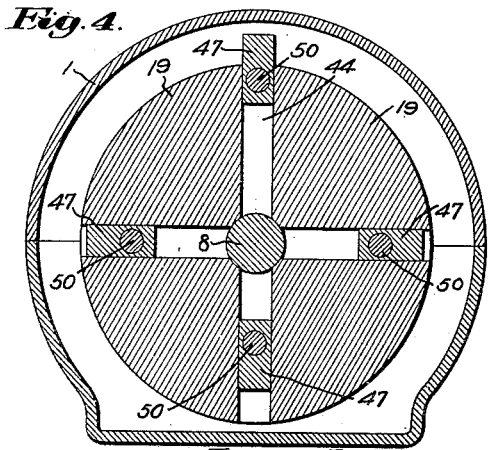
Witnesses:
Horace A. Crossman
Llewellyn Richards
Inventor:
Bicknell Hall.
by Emery, Booth, Janney Varney, Attys Oct. 9, 1923.

B. HALL 1,470,564

TRANSMISSION MECHANISM

Filed Nov. 8, 1913

Witnesses:
Horace A. Grossman
Llewellyn Richards

Inventor:
Bicknell Hall
by Emery, Booth, Janney & Varney
Attys

Patented Oct. 9, 1923.

1,470,564

UNITED STATES PATENT OFFICE.

BICKNELL HALL, OF ABINGTON, MASSACHUSETTS, ASSIGNOR TO HALL CO., OF BOSTON, MASSACHUSETTS, A CORPORATION OF MASSACHUSETTS.

TRANSMISSION MECHANISM.

Application filed November 8, 1913, Serial No. 799,985. Renewed May 7, 1919. Serial No. 295,456.

*To all whom it may concern:*

Be it known that I, BICKNELL HALL, a citizen of the United States, and a resident of Abington, in the county of Bristol and State of Massachusetts, have invented an Improvement in Transmission Mechanism, of which the following description, in connection with the accompanying drawings, is a specification, like characters on the drawings representing like parts.

This invention relates to transmission mechanism, an important object thereof being to provide an improved, simplified and compact construction. The nature of my invention will best appear from a description of a single embodiment thereof selected for illustrative purposes and shown in the accompanying drawings, wherein—

Fig. 1 is a plan view of one type of mechanism embodying my invention;

Fig. 2 is a longitudinal vertical section of the mechanism shown in Fig. 1;

Fig. 3 is a transverse vertical section upon either broken line 3—3 of Fig. 2;

Fig. 4 is a transverse vertical section upon the broken line 4—4 of Fig. 2;

Figure 5:
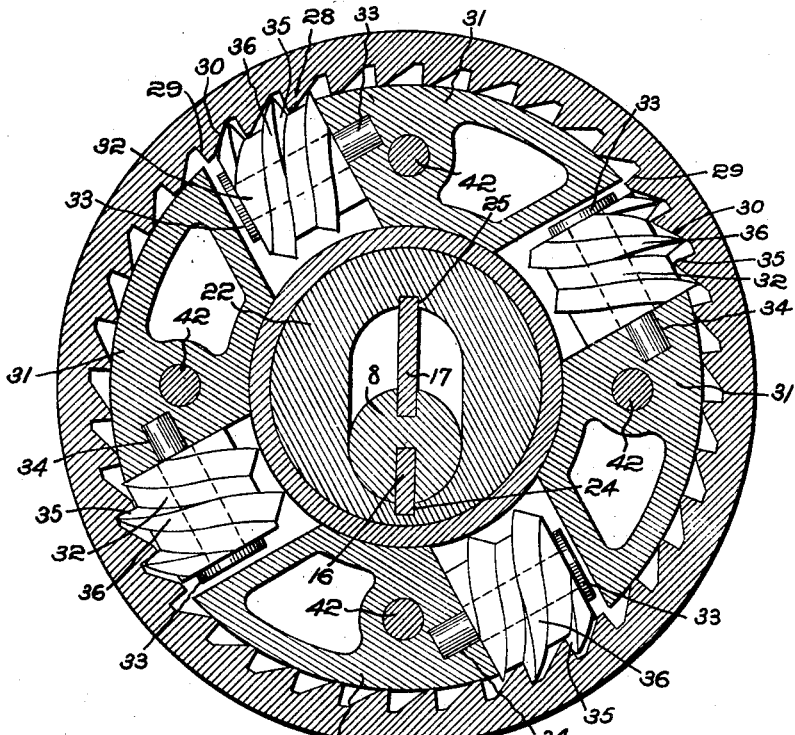
Fig. 5 is a transverse section on a larger scale upon the line 5—5 of Fig. 2.

Referring more particularly to the drawings, I have at 1 indicated a casing made in two or more parts for convenient separation and having sleeve-like, aligned extensions 2, 3 adapted to receive internal sleeves 4, 5. Upon the sleeve 4, I suitably key or otherwise secure a pulley 6 and upon the sleeve 5 I similarly secure a pulley 7. Either pulley 6 or 7 may be used as the driving pulley, power being taken from the other, but I shall for convenience of description refer to the pulley 6 as the driver, and the pulley 7 as the driven member and from which power is taken by belt or in any other suitable manner. Within the sleeve members 4, 5, I position, for axial movement, a shaft 8, to which such movement may be imparted in any suitable manner. Herein for the purpose, I have represented said shaft as having pivotally secured thereto at 9 a lever 10, which at its lower end is pivoted at 11 to a link 12 itself pivoted to the casing 1 at 13. By movement of the lever 10, the axial position of the shaft 8 may be varied as desired.

The said shaft is provided at a suitable number of points intermediate its ends, and dependent in number upon the number of motion transmitting parts, with tapered, longitudinally extending, narrow slots 14, 15, 14', 15' which are adapted to receive wedges 16, 17, 16' 17', the function and purpose of which are hereinafter more fully set forth.

I provide a plurality of disk or ring like transmission members, which I position about the shaft 8 and so operatively connect said members that each is driven from its predecessor at an increased rate of speed. In the construction shown, I employ four such members 18, 19, 20, 21, in addition to the member to which the initial driving speed is imparted, and in the selected embodiment of my invention, the construction is such that I may drive each member a number of revolutions per unit of time exceeding by one half the number of revolutions of the immediately preceding member, this depending upon the amount of relative eccentricity of the said members. Obviously, however, within the scope of my invention and by the adjustment of the parts, the rate of increase may be varied. The rate of increase between succeeding members need not be one half but may be by any desired number of revolutions between the first speed and a determined maximum, and such maximum may readily be increased beyond that herein disclosed within the scope of my invention.

In that form of my invention herein illustrated, I have represented the transmission members 18 and 20 as radially adjustable to any desired extent, and for this purpose have herein represented them as mounted upon eccentrics 22, 23, which are slotted at 24, 25, 24', 25', as illustrated in Figs. 2 and 3, to receive the wedges 16, 17, 16', 17' respectively. By axial movement of the shaft 8, the radial position of the said wedges is varied by the inclined webs 26, 27, with which the upper and lower faces of the wedges 16, 17, 16', 17', cooperate, so as to vary the eccentricity of the eccentrics 22, 23, thus varying the eccentricity of the transmission members 18, 20. Any other suitable means for varying the eccentricity of the transmission members 18, 20, may be employed.

The transmission members 19 and 21 are herein represented as concentrically positioned with respect to the shaft 8. Each member is, however, eccentrically positioned with regard to the transmission member immediately preceding it, and also with regard to the transmission member immediately succeeding it.

I provide suitable means for operatively connecting the respective transmission members in train, so as successively to drive them at an increased speed, as stated, it being obvious from the following description that by adjustment of the eccentricity of the transmission members 18, 20, the rate of increase of the transmission members is varied. In the construction shown, and assuming that the pulley 6 is driven at one hundred revolutions per minute, then the transmission members 18, 19, 20 and 21 are, when the members 18 and 20 are in their positions of greatest eccentricity, driven respectively at 150, 225, 338 and 507 revolutions per minute, so that the driven pulley 7 is driven at a speed of 507 revolutions per minute.

Figure 6:
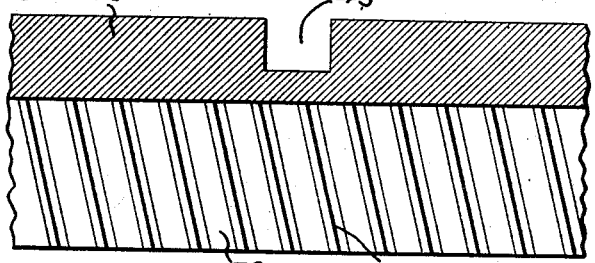
Fig. 6 is a detail, partially in elevation looking outward, of a portion of the worm gear shown in Fig. 5.
Figure 7:
Fig. 7 is a detail of the shaft shown in Fig. 2.

In order operatively to connect the transmission members, I herein provide intermittently acting devices and for that purpose have represented each of said transmission members as provided with internal worm teeth 28, shown most clearly in Figs. 5 and 6. Each of these teeth preferably has one substantially radial face 29 and one inclined face 30. Each of the said transmission members 18, 19, 20 and 21 is provided with an annular guideway, the outer wall of which is formed with the described internal teeth 28, and within said guideways I position a suitable number of segments 31, one series of which is shown in section in Fig. 5. Each of these segments is provided with a worm 32 mounted on a stud 33 received in a suitable socket 34 in the end face of the segment. Each worm 32 is preferably provided with a thread having differentiated or contrasting faces. I have herein represented the rear face 35 of the thread as positioned radially or substantially radially to the axis of the worm, and the opposite or leading face 36 thereof as inclined thereto, so as substantially to correspond to the shape of the internal teeth formed upon the transmission members 18, 19, 20, 21.

The construction of the teeth of the worm wheel and of the threads of the worms in that form of my invention herein illustrated is such that when each set of segments, as for example, the set of segments illustrated in Fig. 5, is moved in a contraclockwise direction, viewing said figure, said inclined faces of each worm thread will, during a portion of each revolution of said worm, engage the inclined faces of the associated worm wheel teeth and so impart rotative movement to said worm wheel. During the other portion of each revolution the inclined faces of said worm threads of each worm in turn will lag behind the related inclined faces of the teeth of the worm wheel so that the radial faces of the teeth of the worms and worm wheel will engage and hence the worms will one after another turn idly upon their axes.

In order to impart the described movements to the segments 31 and consequently to the worms thereof pertaining to transmission member 18, I provide the sleeve 4 with a disk-like extension 37, as illustrated in Fig. 2. I provide the said disk with a series of radial slots, one of which is indicated at 38 in Fig. 1 and two of which are shown at 38, 39 in Fig. 2.

In said slots I position a corresponding number of blocks 40, herein four in number, for radial movement in said slots, and provide each of them with a pin 41, having a preferably reduced end 42, which is mounted in the corresponding segment 31.

In a similar manner the transmission member 18 is provided with a series of radial slots 43, certain of which are shown in Figs. 1 and 2, and the transmission members 19 and 20 are provided with corresponding series of slots 44 and 45. Within these slots are positioned for radial movement the series of blocks 46, 47 and 48 having pins 49, 50 and 51, by which driving movement is communicated to the several sets of segments 31.

Within the scope of my invention, I may employ any suitable means for securing intermittent driving connection between the transmission members 37, 18, 19, 20 and 21, and obviously my invention is not limited to the use of toothed devices. Obviously my invention is not limited to the employment of worms and worm wheels, such as herein disclosed, though the same are peculiarly adapted for the attainment of the results desired. If worms be employed, they may be of any suitable construction, but preferably they are provided with contrasting or differentiated faces or threads, so that the worms act intermittently to impart rotative movement to the transmission members 18, 19, 20 and 21.

Viewing the construction shown in Fig. 5, and assuming that the segments are moving in a contraclockwise direction, as a segment or segments and their worms approach their position of greatest eccentricity or greatest relative eccentricity, such worms act as drivers inasmuch as the inclined faces 36 of the teeth engage the inclined faces of the internal teeth, and thus impart rotative movement to the transmission member having such internal teeth. One or two of the worms of a single series may thus act as drivers at the same time, but as the worms and their segments approach their point of least eccentricity, or least relative eccentricity, the worms cease to act as drivers, inasmuch as the radial faces of the internal teeth of the transmission member overtake and engage the radial faces of the worms, and hence said worms rotate idly upon their axis and cease to act as drivers.

It will be noted that by the employment of worms and segments I provide circumferential series of driving units or pushers which are non-slipping in their driving function. By this I means that said driving units do not rely upon a friction-grip or clutch engagement with the support or surface with which they have driving contact, but have such direct and non-slipping contact therewith that no resultant slipping component is present of such magnitude as would have to be resisted by a friction-gripping device; the direct driving contact and the force component acting along the line of driving thrust predominates over any slipping tendency.

The series of blocks 40, etc., being confined in their respective radial slots remain always upon the same radius of the slotted member, that is, said blocks have always the same angular spacing and angular speed relative to said slotted member, but are positionable through the effect of the herein stationary but adjustable eccentric bearings, and while rotating, at greater or less radial distances from the center of said slotted member in any given eccentric position of adjustment of said bearings. When a block and the segment to which it is pivoted are relatively far off center, said block and segment move at a greater linear speed than when less eccentric. Accordingly the worm moved by such segment is driven axially thereof at a greater linear speed than less eccentric worms of that series and is effective through the driving engagement of its inclined face with the inclined faces of the gear teeth to rotate the member having said gear teeth. At this time, the remaining worms of that series, being less eccentric and moving at a less linear speed lag behind, so to speak, and are overrun by the gear toothed member and caused merely to idle upon their axes due to the radial faces of the gear teeth pressing upon the radial faces of said worms. By varying the eccentricity of the adjustable eccentric bearings said difference in linear speed is correspondingly made greater or less and a proportionate variation in speed is transmitted from one rotary transmission member to the next succeeding member.

It will be observed that although but two of the transmission members are represented as eccentrically positioned with respect to the shaft 8, yet each transmission member is eccentrically positioned with respect to the immediately preceding transmission member and the immediately succeeding transmission member. Said two members eccentrically positioned with respect to the driving element 37 or 21, dependent upon at which end of the mechanism the power is applied, namely, members 18 and 20 are operatively connected with the driven element 21 or 37 as the case be by means of the above described worms and segments distributed about the axes of said elements and of the elements 37 and 21 and herein constituting a circumferential series of one form of driving units; said members 18 and 20 are also connected in a similar manner with the rotatable members 19 and 21 respectively. With respect to its succeeding member each transmission member 18—20 is a driving element, and with respect to its preceding member is a driven element. The axes of said driving and driven elements, including also the driving or driven elements 37 and 21 are relatively adjustable into positions of greater or less relative eccentricity, including concentricity. By means of the described non-slip, non-clutching driving elements a relative rotary motion is imparted to each succeeding transmission member and to the ultimately driven element. The result of such arrangement is to obtain the described increased speed of rotation of each transmission member with respect to that immediately preceeding.

From the foregoing description, it will be understood that I may start with any desired initial speed and obtain an ultimate speed dependent upon the number of transmission members employed and their relative eccentricity. Inasmuch as the eccentricity may be varied to any desired extent, it is obvious that the ultimate speed may be such as desired. The derived motion is a constant one, inasmuch as one or more worms of each set is in constant driving relation to its associated transmission member.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Transmission mechanism comprising in combination, driving and driven elements, and a plurality of interposed rotary members operatively connected thereto, a shaft common to and supporting said members and upon which alternate members are eccentrically adjustable, each member being eccentric to and operatively connected to its immediate predecessor.

2. Transmission mechanism comprising in combination, driving and driven elements, and a plurality of interposed rotary members operatively connected thereto, a shaft common to and supporting said members and upon which alternate members are eccentrically adjustable, and means connecting each member to its immediate predecessor whereby each member is driven at a speed exceeding that of its predecessor by an amount dependent upon the extent of its eccentricity relative to it.

3. Transmission mechanism comprising in combination a driving element, a shaft co-axial therewith and having alternate eccentrically adjustable and concentric bearings, a series of rotatable members upon respective bearings, each such member eccentric relatively to the one preceding, and driving connections between said driving element and one of said members and between the successive members whereby said members are rotated in train at successively increased speeds.

4. Transmission mechanism comprising in combination a driving element, a shaft co-axial therewith and having alternate eccentrically adjustable and concentric bearings, a series of rotatable members upon respective bearings, each such member eccentric relatively to the one preceding, driving connections between said driving element and one of said members and between successive members whereby said members are rotated in train at successively increased speeds, and means to adjust said adjustable bearings thereby to vary the rate of increase in speed.

5. Transmission mechanism comprising in combination, a driving element, a co-axial shaft, a series of members rotatably supported thereon, means connecting said members with said driving element and with each other to drive them in train from said driving element, and means eccentrically to position one or more of said members with relation to said shaft thereby to vary the speed of said series of members.

6. Transmission mechanism comprising in combination, a driving element, a normally stationary shaft concentric therewith, a series of rotatable members mounted about and upon said shaft, said members being driven in train from said element and being adjustable to various positions of eccentricity relative to each other, and means for driving each of said members from its predecessor at an increase of speed thereover dependent upon the extent of said relative eccentricity.

7. Transmission mechanism comprising in combination, a driving element, a normally stationary supporting shaft therefor, fixed and adjustable bearings upon said shaft, a series of members rotatable upon said bearings and driven in train from said element, means eccentrically to position said members relatively to each other by movement of said adjustable bearings, and driving connections between said members.

8. Transmission mechanism comprising in combination a driving element, a series of rotatable transmission members, a shaft co-axial with said driving element and whereon said members are rotatably supported, variable means to impose relative eccentricity upon said members and driving element, and a circumferential series of intermittently acting driving connections between said members and between one of said members and said driving element.

9. Transmission mechanism comprising in combination, a driving element, a series of rotatable transmission members, variable means to impose relative eccentricity thereon, and intermittently acting, universally engageable toothed, driving connections between said members and between one of said members and said driving element.

10. Transmission mechanism comprising in combination, a driving element, a series of rotatable transmission members, a normally stationary shaft supporting said members, variable means to impose relative eccentricity upon said members, and intermittently acting worm and worm wheel connections between said members and between one of said members and said driving element.

11. Transmission mechanism comprising in combination, driving and driven elements, a shaft about which said elements are rotatable, a plurality of bearings on said shaft, interposed transmission members respectively rotatably mounted on said bearings, intermittently acting driving connections between said members and between the opposite end members and said driving and driven elements respectively, and means to vary the relative speed of said members by varying their relative eccentricity.

12. Speed varying transmission mechanism comprising in combination, a shaft, a transversely adjustable bearing thereon, driving and driven elements loose upon said shaft, and driving connections between said driving and driven elements including a ring-like member loose upon said adjustable bearing and a circumferentially movable series of segments and worms operatively connecting said member and the driving element and radially variably connected with one of them, and a similar series of segments and worms operatively connecting said member and the driven element.

13. Transmission mechanism comprising in combination, driving and driven elements, an intermediate series of transmission members, a shaft coaxial with said elements and having a series of bearings respectively rotatably to support said transmission members, and intermittently acting means to drive one end member of said series from said driving element and to drive each succeeding member from its predecessor, said driven element being driven by the other end member of said series.

14. Transmission mechanism comprising in combination, driving and driven elements, a shaft extending coaxially of said elements and about which they are freely rotatable, fixed and transversely adjustable bearings upon said shaft, a series of transmission members rotatively supported upon said bearings, a circumferential series of worm devices to drive each member from its predecessor, and a similar series of devices drivingly connecting the first and last of said members with said driving and driven elements respectively.

15. Transmission mechanism comprising in combination, driving and driven elements, a shaft extending coaxially of said elements and about which they are freely rotatable, fixed and transversely adjustable bearings upon said shaft, a series of transmission members rotatively supported upon said bearings, a circumferential series of intermittently acting devices to drive each member from its predecessor, and means for eccentrically positioning said adjustable bearing and their transmission members thereby to effect a variable increase in speed of each member over its predecessors.

16. Transmission mechanism comprising in combination, driving and driven elements, a shaft extending coaxially of said elements and about which they are freely rotatable, fixed and transversely adjustable bearings upon said shaft, a series of transmission members rotatively supported upon said bearings, a circumferential series of intermittently effective segmental driving connections between each of said members and between said members and said driving and driven elements, and means to impose relative eccentricity upon said members.

17. Transmission mechanism comprising in combination, driving and driven elements, a shaft extending coaxially of said elements and about which they are freely rotatable, fixed and transversely adjustable bearings upon said shaft, a series of transmission members rotatively supported upon said bearings, segmental driving connections arranged in series between each of said members and between said members and the driving and driven element, and means for imposing relative eccentricity upon said members thereby to render the driving connections in each series progressively active upon their respective transmission members.

18. Speed varying mechanism comprising in combination, a normally stationary shaft, a rotatable driving element surrounding the axis of said shaft, a transversely adjustable bearing upon said shaft, a driven element loose upon said bearing, and a circumferential series of driving units between said driving and driven elements and operatively connected at one of their ends with one of said elements and having intermittently effective consecutive direct driving contact at their opposite ends with the other of said elements whereby rotation of the driving element imparts rotation to the driven element.

19. Speed varying mechanism comprising in combination, a normally stationary shaft, a rotatable driving element surrounding the axis of said shaft, a bearing upon said shaft adjustable to be more or less eccentric relative to said driving element, a driven element loose upon said bearing, and a circumferential series of driving units having segmental portions, said units being distributed about the axes of said elements and operatively connected with one and having intermittently effective driving engagement at any point circumferentially upon the other element whereby rotation of the driving element imparts rotation to the driven element at a speed dependent upon the extent of said relative eccentricity.

20. Speed varying mechanism comprising in combination, a normally stationary shaft, a rotatable driving element surrounding the axis of said shaft, a transversely adjustable bearing upon said shaft, means to adjust said bearing, a driven element loose upon said bearing, and a circumferential series of driving units having segmental portions, said units being distributed about the axes of said elements and operatively connected with one element and having intermittently effective non-clutching driving engagement at any point circumferentially upon the other element.

21. Speed varying mechanism comprising in combination a normally stationary shaft, a rotatable driving element surrounding the axis of said shaft, a bearing upon said shaft eccentrically positionable relatively to said driving element, a driven element rotatable upon said bearing, a circumferential series of driving units distributed about the axes of said elements, operatively connected with one and having sequential driving engagement at any point circumferentially upon the other element thereby to rotate said driven element at a speed differing from that of the driving element in proportion to the relative eccentricity of said elements.

22. Speed varying mechanism comprising in combination, a normally stationary shaft, a rotatable driving element surrounding the axis of said shaft, a transversely adjustable bearing upon said shaft, a driven element loose upon said bearing, one of said elements provided with a worm gear, the other element having operatively connected to it a series of worms each having a thread with a driving face and a non-driving face intermittently effective to co-act with said gear whereby rotation of the driving element imparts rotation to the driven element.

23. Speed varying mechanism comprising in combination, a normally stationary shaft, a rotatable driving element surrounding the axis of said shaft, a bearing upon said shaft adjustable to be concentric or eccentric relatively to said driving element, a driven element loose upon said bearing, one of said elements provided with a worm gear, one or more worms each having a thread with a driving face and a non-driving face, means operatively connecting said worm or worms to the other element for optionally continuously effective or intermittently effective driving engagement with said gear as said bearing is concentric or eccentric respectively and whereby rotation of the driving element imparts rotation to the driven element at the same or at a greater speed than that of the former in said respective adjusted positions of said bearing.

24. Speed varying mechanism comprising in combination, a normally stationary shaft, a rotatable driving element surrounding the axis of said shaft, a transversely adjustable bearing upon said shaft, means operable with the parts at rest or during movement thereof to adjust said bearing, a driven element loose upon said bearing, a worm gear upon one of said elements, and a circumferential series of worms operatively connected with the other element, said worms each having a driving face and a non-driving face to co-act with said gear.

25. Variable speed transmission mechanism comprising in combination rotatable driving and driven elements, one of which has a worm gear, a circumferential series of worms connected to the other element and co-acting with said gear, each worm having a thread with a driving face and a non-driving face, means whereby the driving element imparts to said worms and gear relative movement about the axis of the latter, and means to vary the relative positions of the axes of said elements thereby to vary the extent of said movement, at least one worm at all times being drivingly effective.

26. Variable speed transmission mechanism in combination rotatable driving and driven elements, one of which has a worm gear, a circumferential series of worms engageable with said gear, each worm having a thread with a driving face and a non-driving face, means operatively connecting said worms with the other element whereby constant rotation of the driving element imparts through said worms rotation to the driven element, and means operable during movement of the parts to vary the relative positions of the axes of said elements thereby to vary the speed of rotation of said driven element.

In testimony whereof I have signed my name to this specification in the presence of two subscribing witnesses.

BICKNELL HALL.

Witnesses:
MABEL S. WRIGHTINGTON,
ALDIBERT CLAIR DEERING.